United States Patent
Hwang

(10) Patent No.: US 7,139,238 B2
(45) Date of Patent: Nov. 21, 2006

(54) APPARATUS AND METHOD FOR MULTIPLEXING SPECIAL RESOURCE OF INTELLIGENT NETWORK-INTELLIGENT PERIPHERAL

(75) Inventor: Min Yong Hwang, Kyungki-Do (KR)

(73) Assignee: LG-Nortel Co., Ltd., Seoul (KR)

( * ) Notice: Subject to any disclaimer, the term of this patent is extended or adjusted under 35 U.S.C. 154(b) by 907 days.

(21) Appl. No.: 10/026,796

(22) Filed: Dec. 27, 2001

(65) Prior Publication Data
US 2002/0080946 A1 Jun. 27, 2002

(30) Foreign Application Priority Data
Dec. 27, 2000 (KR) .............................. 2000-82586

(51) Int. Cl.
*G06F 11/00* (2006.01)
*H04J 3/16* (2006.01)
*H04L 12/28* (2006.01)

(52) U.S. Cl. .................. 370/218; 370/468; 370/401; 714/1; 714/2; 714/4

(58) Field of Classification Search ........ 370/216–221, 370/241.1, 242, 244, 250, 235; 714/1, 2, 714/4
See application file for complete search history.

(56) References Cited

U.S. PATENT DOCUMENTS

| | | | | |
|---|---|---|---|---|
| 5,883,939 A * | 3/1999 | Friedman et al. ............... 379/9 |
| 5,889,848 A * | 3/1999 | Cookson ....................... 379/230 |
| 5,898,667 A * | 4/1999 | Longfield et al. ............ 370/225 |
| 5,923,643 A * | 7/1999 | Higgins et al. .............. 370/218 |
| 5,933,474 A * | 8/1999 | Kipp .......................... 379/9.05 |
| 6,005,841 A * | 12/1999 | Kicklighter ................. 370/217 |
| H1859 H * | 9/2000 | Asthana et al. .............. 370/217 |
| 6,205,557 B1 * | 3/2001 | Chong et al. ................... 714/4 |
| 6,208,616 B1 * | 3/2001 | Mahalingam et al. ........ 370/216 |
| 6,724,875 B1 * | 4/2004 | Adams et al. .......... 379/201.01 |
| 6,778,488 B1 * | 8/2004 | Long et al. .................. 370/216 |
| 6,778,490 B1 * | 8/2004 | Achilles et al. ............. 370/217 |
| 6,798,744 B1 * | 9/2004 | Loewen et al. .............. 370/235 |
| 6,804,711 B1 * | 10/2004 | Dugan et al. ................ 709/223 |
| 6,850,482 B1 * | 2/2005 | Ashdown et al. ........... 370/217 |
| 6,895,528 B1 * | 5/2005 | Cantwell et al. .............. 714/12 |
| 6,925,052 B1 * | 8/2005 | Reynolds et al. ........... 370/217 |
| 2001/0053158 A1 * | 12/2001 | Cai et al. .................... 370/467 |

* cited by examiner

Primary Examiner—Ricky Q. Ngo
Assistant Examiner—Venkatesh Haliyur
(74) Attorney, Agent, or Firm—Fleshner & Kim, LLP

(57) ABSTRACT

An apparatus and method for multiplexing a special resource of an intelligent network-intelligent peripheral (IN-IP) are disclosed, including a plurality of specialized resources that provide services to subscriber calls, contacting an intelligent network, and a plurality of modules that manage groups of the specialized resources. A main processor manages the plurality of modules and collects state information from each of the modules. A resource management block restores a service to a subscriber call, disrupted by a faulty one of the specialized resources, in accordance with the state information collected by the main processor.

12 Claims, 5 Drawing Sheets

SPECIAL RESOURCE STATE INFORMATION MESSAGE

SPECIAL RESOURCE MULTIPLEXING MESSAGE

APPARATUS AND METHOD FOR MULTIPLEXING SPECIAL RESOURCE OF INTELLIGENT NETWORK-INTELLIGENT PERIPHERAL

BACKGROUND OF THE INVENTION

1. Field of the Invention

The present invention relates to an intelligent network service system and, in particular, to an apparatus and a method for multiplexing a special resource of an intelligent peripheral.

2. Background of the Related Art

An intelligent network is a structural concept of a communication network that provides a service, satisfying a request of a communication network user, using an intergrated database and a common channel signaling network, which is accessible to the database. An intelligent (superior) hierarchy provides various services that are independent of a transmission (subordinate) hierarchy and a signal (intermediate) hierarchy. Due to the network structure, the intelligent network has characteristics such as the separation of a service and a network, an economical new-service integration time, and a retrenchment of expenditure, etc.

The intelligent network can provide numerous services. For example, it can provide a "number converting service" that converts a logical number, provided by intelligent service logic, into an actual telephone number; a "billing service" that offers billing flexibility by diversifying billing forms, according to a kind of service; a "restrictive service" that restricts a service by inspecting a specific certification, such as an access condition, an access permission limit, etc.; a "call completion service during terminating service"; a "call reference service"; a "prank (malicious) call tracking service"; a "mass calling service"; a "telephone poll service"; and a "virtual private network service", etc. At the present time, types and functions of intelligent services have been diversified according to various requests of subscribers and the development of No.7 common channel signaling network techniques.

As described above, the structure of the intelligent network is constructed with a service network hierarchy, having data about subscribers and controlling an intelligent network service; a signal network hierarchy, connecting and relaying the superior service network hierarchy; and a subordinate transmission network hierarchy. The transmission network hierarchy exchanges and transmits information such as voice and data. The transmission network hierarchy is constructed with a service switching point (SSP) that discriminates an intelligent network service call, from other types of subscriber calls, and requests control information. Additionally, the transmission network hierarchy has an intelligent peripheral (IP) connected to the SSP to perform a voice guide broadcast, a voice synthesis, an automatic voice recognition, an additional digit collection, etc.

FIG. 1 is a physical construction profile illustrating a general intelligent network. Because the intelligent network connects the SSP 20, a service control point (SCP) 40, and an IP 30 with a No.7 common channel signaling network 50, it is possible to generate and manage a new service more efficiently.

The SSP 20 connects a service subscriber to the intelligent network by recognizing an intelligent network service call of the subscriber and connecting it to the SCP 40.

The SCP 40 controls an intelligent network service. It manages a database providing service control logic and subscriber information, to make the SSP 20 process the intelligent network service call.

The IP 30 is connected to at least one SSP 20 or SCP 40, through the No.7 common channel signaling network 50, and supports flexible and efficient information exchange between a subscriber and the intelligent network. It does this by providing a special resource that performs a voice guide broadcast, a voice recognition, a voice synthesis, a dual tone multi frequency (DTMF) collection, a protocol change, and a facsimile document processing, etc.

Generally, an operation apparatus or a switching system has at least one reserve apparatus preparing for an error occurrence in the operation. The IP 30 has a duplexing system or a multiplexing system to provide an intelligent network service, smoothly.

If the IP 30 has a duplexing system, two IP (i.e., active & stand-by) parts are constructed. When an error occurs in the active system, a fail-over of the active system is instantly performed and the stand-by system replaces the active system to perform an intelligent service. When the IP 30 has a multiplexing system, the IP 30 reserves some (i.e., M-number) of the special resource processing devices (i.e., N+M) for the error occurrence.

FIG. 2 is a block diagram illustrating the background art special resource multiplexing apparatus of an intelligent network-intelligent peripheral (IN-IP). The IN-IP special resource multiplexing apparatus includes a plurality of special resource processing modules (hereinafter, referred to as modules) (1~N) providing a requested service to a subscriber. Reserve modules (N+1~N+M) perform a backup function for a faulty module, when an error occurs in the module. A plurality of main processors 120 check for an error occurrence within the modules (1~N) and perform a retrieval feature, and a main processor 130 controls the reserve modules. A special resource management block 110 checks for an error occurrence in the modules (1~N) and manages a device block required for special resource multiplexing.

The special multiplexing system of the IN-IP will be described below. While the IP 30 provides an intelligent network service, the special resource management block 110 periodically checks for an error occurrence within modules 1~N and a transmitted external signal. In more detail, it judges whether an error occurs at the module and checks whether there is a new intelligent network service request call. When there is a new intelligent network service request, the special resource management block 110 retrieves an availability indicator from each module (1~N) and allocates the intelligent network service request call to an available module having an idle special resource.

When an error occurs in a module, the special resource management block 110 isolates the faulty module and logically replaces the faulty module with one the reserve modules (N+1~N+M).

In more detail, the main processor 120 transmits an error sensing signal to each module (1~N) to check a state of the modules (1~N), under the control of the special resource management block 110. Each module (1~N) transmits state information, about itself, to the main processor 120, as a reply. And, the main processor 120 transmits the state information received from each module (1~N) to the special resource management block 110.

The special resource management block 110 analyzes the received state information of the modules (1~N), isolates the faulty module, and logically replaces the faulty module with an idle reserve module. And, the service performed previously by the faulty module resumes using a special resource of the backup reserve module, replacing the faulty module.

As described above, the special resource multiplexing method performs a service by operating the reserve modules (N+1~N+M) and the modules (1~N) separately, wasting resources as described below. First, a reserve special resource processing module that replaces a first faulty module cannot later replace a second faulty module, regardless of its unused capacity. Second, an entire module is replaced by a reserve module, even when an error occurs within a single channel of a module having multiple channels. Thirdly, a pertinent module is judged as faulty and is isolated regardless of an operation state of the rest of channels.

In addition, when the load on the modules (1~N) is large, it is impossible to use the reserve modules (N+1~N+M) in a supplementary capacity. Accordingly, a usage efficiency of the special resource is low and a uniform distribution of the load can not be performed.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Accordingly, it is an object of the present invention to provide an apparatus and a method for multiplexing a special resource of an intelligent network-intelligent peripheral (IN-IP) that are capable of performing error sensing and error restoration of a special resource.

It is another object of the present invention to provide an apparatus and a method for multiplexing a special resource of an IN-IP that are capable of restoring an error with only a general module, without using an additional reserve module.

It is still another object of the present invention to provide an apparatus and a method for multiplexing a special resource of an IN-IP that are capable of performing an error restoration process, in consideration of a load quantity of a module.

In order to achieve the above-mentioned objects, an apparatus for multiplexing a special resource of an IN-IP comprises a plurality of special resources providing services to subscriber calls, which contact an intelligent network; a plurality of modules managing a certain number of special resource groups; a main processor managing the plurality of modules and collecting special resource state information from each module; and a special resource management block restoring an error, using special resource units, by analyzing the information collected by each main processor, when the error occurs at a certain module.

In addition, a method for multiplexing a special resource of an In-IP comprises periodically collecting state information of a special resource from all modules of an IP; checking whether there is an error in a special resource by analyzing the collected information; isolating a pertinent special resource when the special resource has an error; collecting information about a service performed by the isolated special resource and information about an available special resource replacing the isolated special resource; generating a special resource multiplexing message, according to the collected information, and transmitting it to a module (available module) having an available special resource; and resuming the interrupted service, by referring to the special resource multiplexing message transmitted from the available module.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
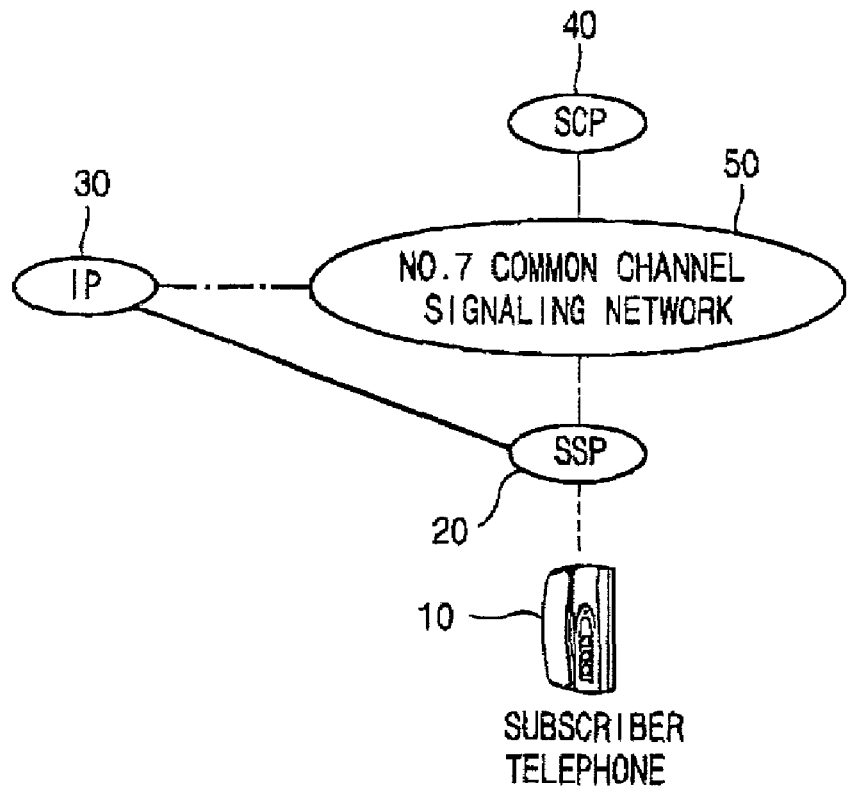
FIG. 1 illustrates a background art intelligent network.
Figure 2:
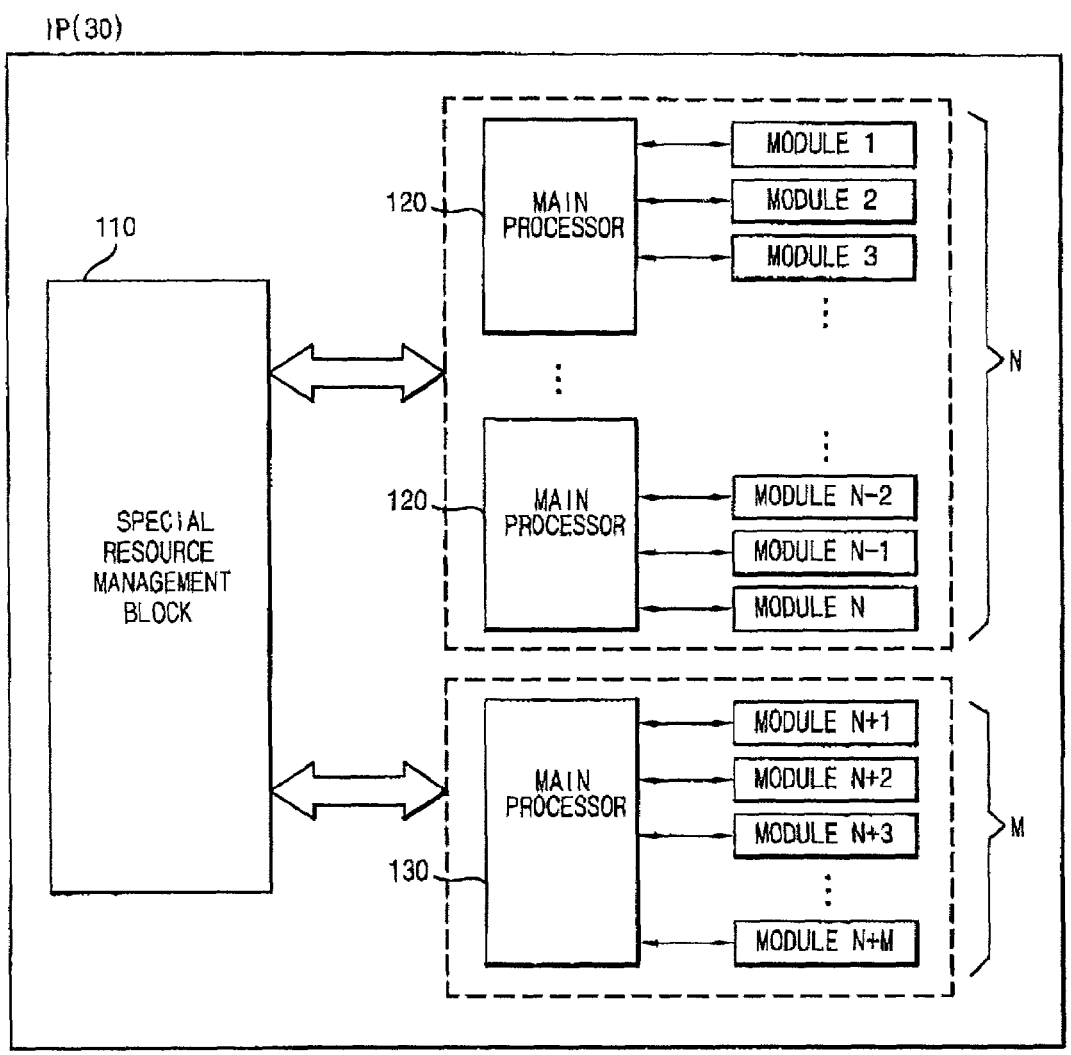
FIG. 2 illustrates the background art special resource multiplexing apparatus of an IN-IP.
Figure 3:
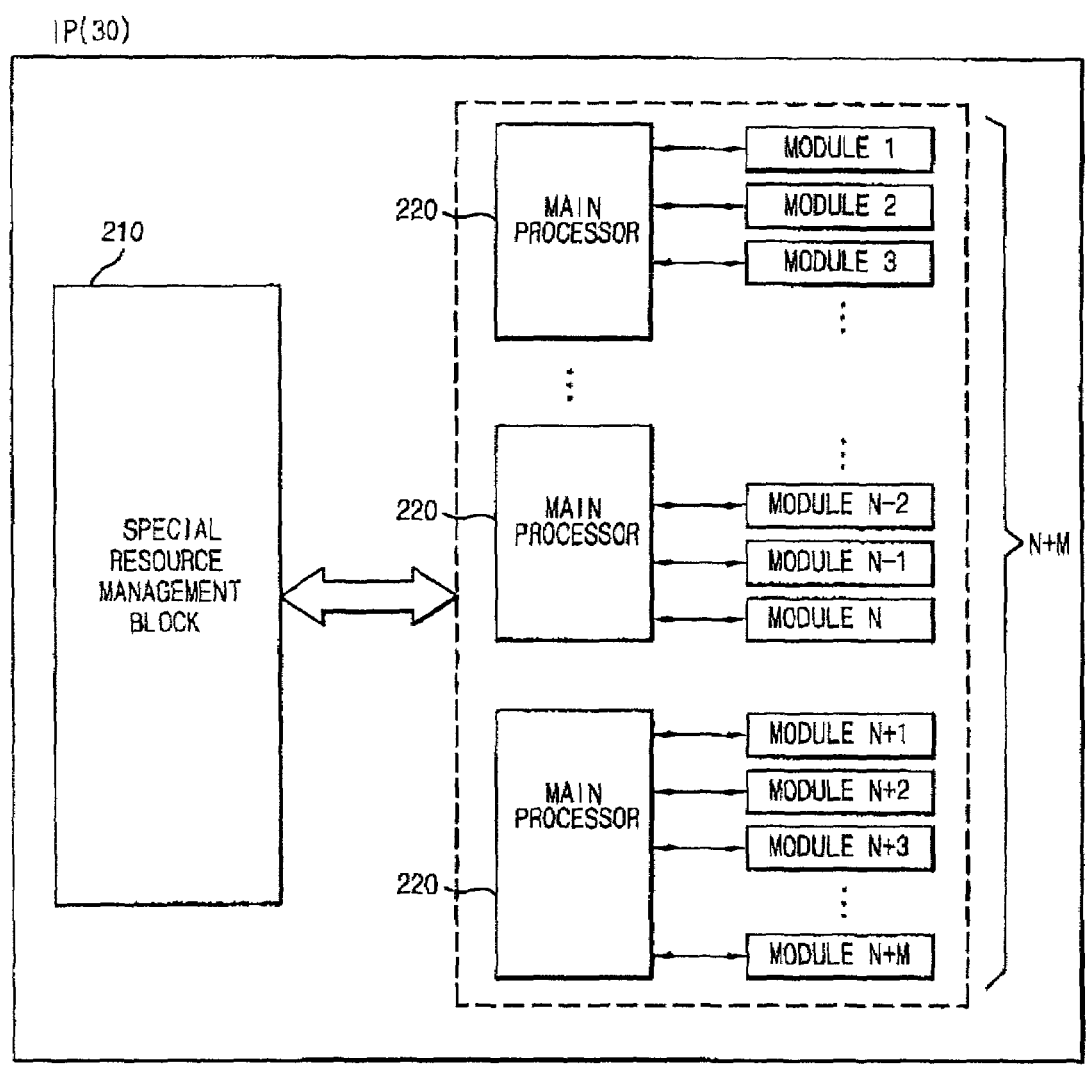
FIG. 3 illustrates a special resource multiplexing apparatus of an IN-IP, in accordance with the present invention.

FIG. 3 is a block diagram illustrating a special resource multiplexing apparatus of an IN-IP, in accordance with the present invention. The special resource multiplexing apparatus of an IN-IP includes a plurality of modules (1~N+M), providing a requested service to a subscriber by allocating an idle channel to an intelligent network service call. A plurality of main processors 220 check a load quantity and an error occurrence of the modules (1~N+M) and retrieve state information of each module (1~N+M). A special resource management block 210, operating as a virtual device, is provided the state information of the modules (1~N+M) by the main processors 220. The special resource management block 210 analyzes the state information to allocate a special resource to the intelligent network service call and restore an error of the special resource.

The modules (1~N+M) include a plurality of special resources. Each special resource is allocated to an intelligent network service call. Accordingly, an intelligent network service is provided to a subscriber.

Figure 4:
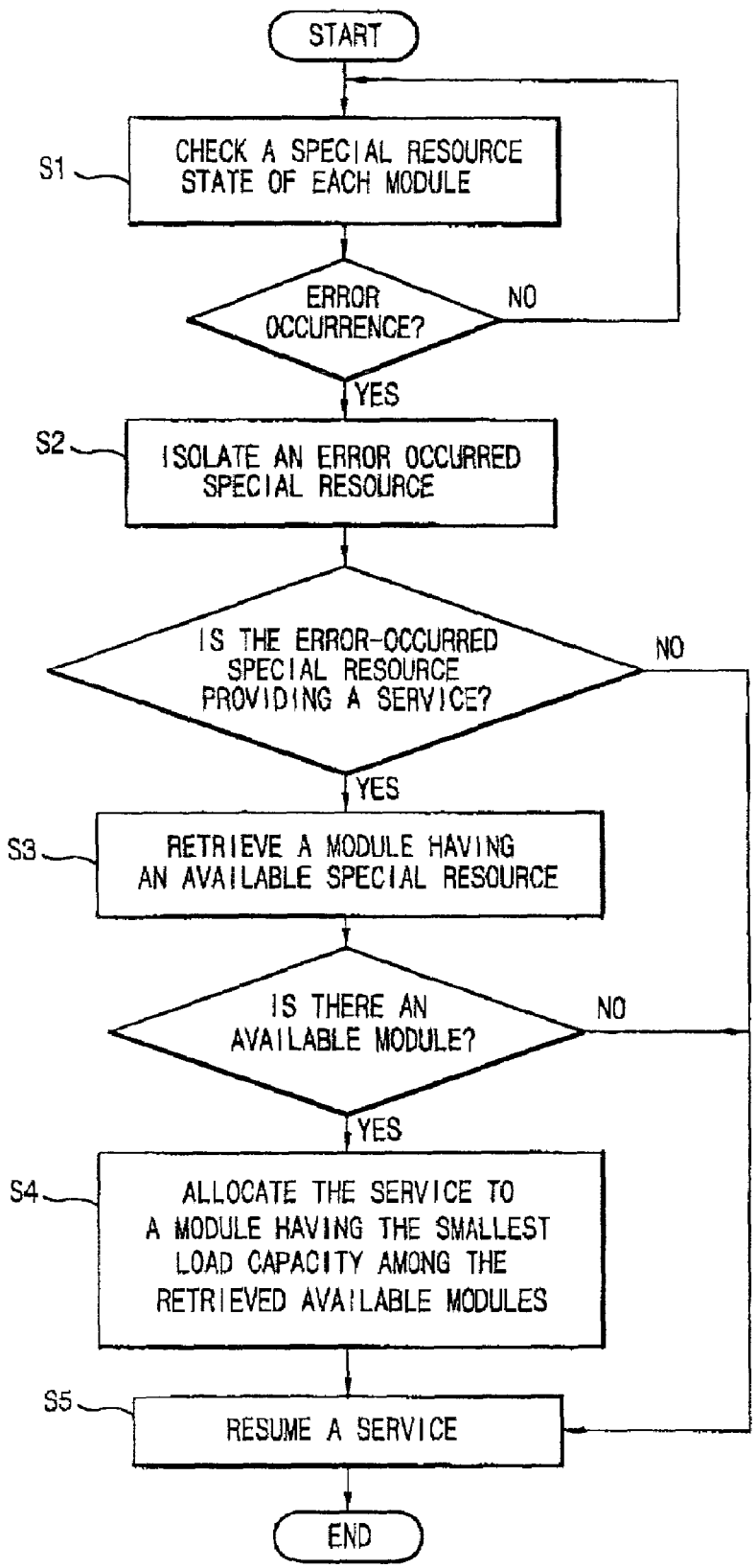
FIG. 4 illustrates a special resource multiplexing method of an IN-IP, in accordance with the present invention.

FIG. 4 is a flow chart illustrating a special resource multiplexing method of an IN-IP, in accordance with the present invention. The special resource multiplexing method includes observing each module (1~N+M) for an error occurrence and checking whether there is a special resource request signal from outside (S1). An error is processed by isolating the module having the sensed error (S2) and an available module is retrieved when the special resource request signal is detected (S3). A pertinent module is allocated to an intelligent network service call, requesting a special resource, when a substitute module is available for retrieval (S4). Thereafter, the module provides the requested special resource to the intelligent network service call (S5).

In summary, the error processing procedure includes the steps of receiving an error occurrence signal (S1); isolating a pertinent module (S2); retrieving an available module from all modules, excluding the faulty module (N+M−1), when the isolated module performs a service (S3); performing a backup, by dispersing the faulty module to the plurality of available modules, when there is another available module (S4); and resuming the service interrupted by the error occurrence (S5).

The apparatus and method for multiplexing a special resource of the IN-IP will be described with reference to FIGS. 3–6. The special resource management block 210 observes a state change of an error occurrence within special resources of the modules (1~N+M) (S1). This is accomplished in the following way. Under the control of the special resource management block 210, the main processor 220 periodically transmits a special resource state check signal to each module (1~N+M). Each module (1~N+M) receiving the special resource state check signal transmits a special resource state information message, illustrated by FIG. 5, to the main processor 220. And, the main processor 220 transmits the received special resource state information message to the special resource management block 210.

Figure 5:
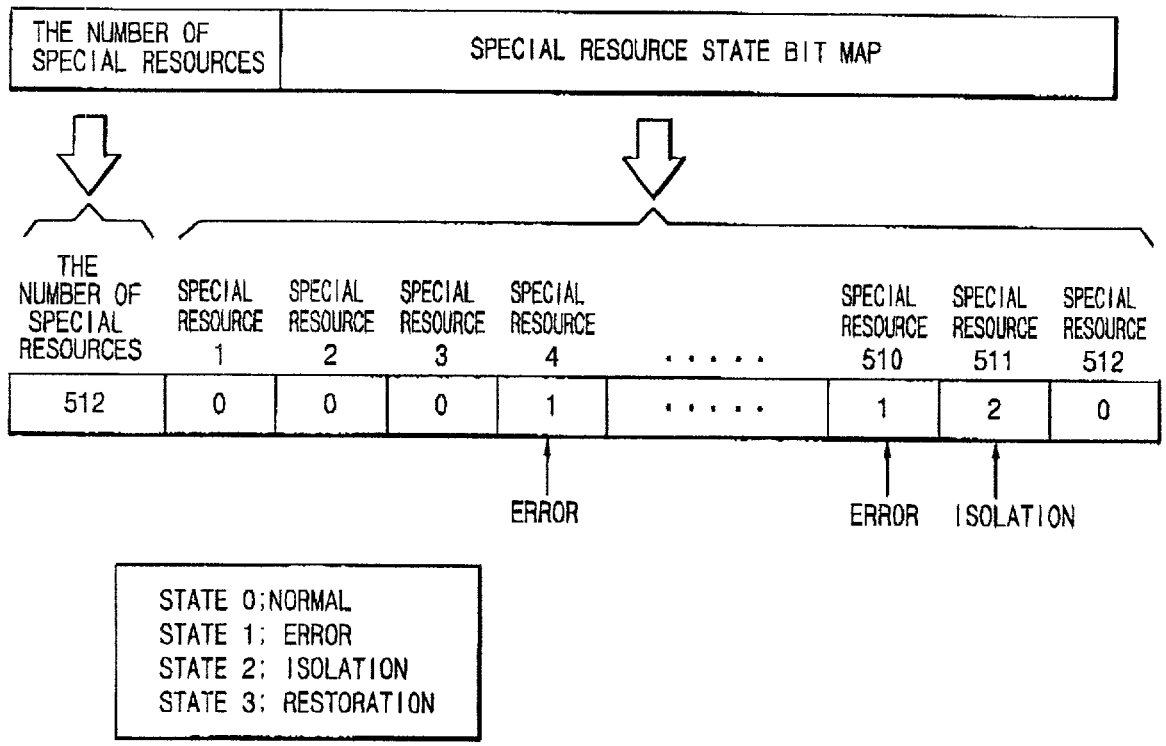
FIG. 5 illustrates a special resource state information message in accordance with the present invention.

Referring now to FIG. 5, the special resource state information message is constructed with special information number information, indicating the number of special resources of a pertinent module, and a special resource state bit map, indicating a state of each special resource. The bit map contains one byte for each of the corresponding module's special resources. Each block has a state value from the set 0, 1, 2, 3. When a state value is 0, a pertinent special resource is operating normally. When a state value is 1, the pertinent special resource is in the error occurrence state. When a state value is 2, the pertinent special resource is in isolation. When a state value is 3, it indicates the restoration of the pertinent special resource.

The special resource management block 210, receiving the special resource state information message, observes the special resource bit map, to check whether there is an error occurring in a special resource of the module. When an error occurs, the special resource management block 210 isolates the faulty special resources of the pertinent module (S2) and checks whether the faulty special resource is performing a service. When the faulty special resource is performing a service, the special resource management block 210 retrieves a module having an available special resource, from all modules, excluding the faulty module (S3). The retrieving step (S3) replaces the faulty special resource with a similar special resource, from an operational module, to resume the service interrupted by the error occurrence.

The special resource management block 210 allocates the service, interrupted by the error occurrence, to a special resource of the particular module having the lowest active load (S4). When an error occurs throughout the special resources of the module and it is impossible to reassign the interrupted service to a single available module, the service is allocated to several available modules. Herein, the service is reassigned first to an available module having the smallest load quantity.

The service allocating step of step S4 will be described in more detail, with reference to FIGS. 3 and 6. The special resource management block 210 generates a special resource multiplexing message, corresponding to the number of faulty special resources. This message is based on the various information collected from the modules (1~N+M) and the main processors 220. Then, the special resource management block 210 transmits the message to each main processor 220.

Figure 6:
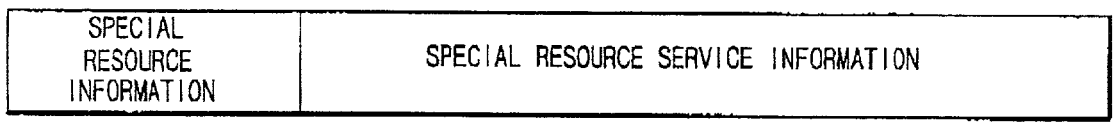
FIG. 6 illustrates a special information multiplexing message, in accordance with the present invention.

Referring now to FIG. 6, the special resource multiplexing message is constructed with special resource information and special resource service information. The special resource information is information about the number of modules having a special resource replaced and an index of a pertinent special resource of the module. The special resource service information includes information for resuming a service at an error-occurrence time point, namely, intelligent network protocol information for a special resource. Generally, the intelligent network protocol message is a PRM for recording a message, a PCUI for collecting a guide broadcast and digit, and a PA for transmitting a guide broadcast, etc.

The main processor 220 analyzes special resource information and special resource service information of the received message, allocates the interrupted service to the available special resource, and resumes the intelligent network service S5. The structures of the special resource state information message and special resource multiplexing message are illustrated in FIGS. 5 and 6.

Because the special resource management block 210 is a virtual device implemented by software, it can handle a special resource unit of a module and control a special resource and a module flexibly. Accordingly it is possible to improve the operational efficiency.

In the background art, an intelligent peripheral (IP) of an intelligent network provides an intelligent network service by dividing modules into service providing modules and reserve modules. In a method for multiplexing a special resource of an IN-IP in accordance with the present invention, a processing capacity of an IP is relatively increased by allocating all modules to the service provisioning, without allocating reserve modules separately. In addition, when an error occurs in part of the special resources of a module, because the IP disperses the service performed by the faulty special resource to the modules having available special resource, it is possible to overcome more than M-number of faulty special resources and a load can be dispersed evenly to each module.

In another preferred embodiment, only the faulty special resources of the module are isolated, rather than the entire module. The operational special resources of a module having a fault may still be used. For example, suppose the IP 30 has a total of five modules that each have ten A-type, five B-type, and three C-type special resources. Further suppose that three of the modules each have faults in two of their respective B-type special resources. Together, the five modules may still support up to nineteen separate service calls for the B-type special resources. Nineteen service calls can be supported, because six of the twenty-four total B-type special resources supported by the combined modules are faulty. Therefore, up to nineteen B-type service calls may be assigned among the five modules in a manner designed to equalize the load supported by each module.

In addition, by embodying a special resource management block as a software-like device, in contrast to the background art, the waste of hardware resources can be prevented. Also, the cost of the whole system can be reduced and it is also possible to obtain a special resource management block in a foreign IP special resource multiplexer.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for multiplexing a specialized resource of a network peripheral, comprising:
   a plurality of specialized resources that provide services to subscriber calls contacting a network;
   a plurality of modules that manage a number of specialized resource groups;
   a main processor that manages the plurality of modules and collects state information from each of the plurality of modules;
   a resource management block that restores a service to a subscriber call, disrupted by a faulty one of the plurality of specialized resources, in accordance with the state information collected by the main processor;
   a means for isolating the faulty one of the plurality of specialized resources; and
   a means for generating a multiplexing message, according to the collected state information, and dispersively transmitting the multiplexing message to particular modules, of the plurality of modules, having a small load and a particular specialized resource available to replace the isolated specialized resource.

2. The apparatus of claim 1, wherein the resource management block includes:
   a means for collecting information about the service performed by the isolated specialized resource and information about the particular specialized resource available to replace the isolated specialized resource; and
   a means for resuming the service disrupted by the faulty one of the plurality of specialized resources.

3. The apparatus of claim 1, wherein the multiplexing message is generated for each subscriber call disrupted by a faulty one of the plurality of specialized resources.

4. The apparatus of claim 1, wherein the multiplexing message includes information identifying a number of a particular module having the particular specialized resource available, an index of the particular specialized resource, and a type of the service disrupted by the faulty one of the plurality of specialized resources.

5. The apparatus of claim 1, wherein the state information comprises specialized resource number information, indicating the number of specialized resources supported by the corresponding module, and a specialized resource state bit map indicating a state of each of the specialized resources supported by the corresponding module.

6. The apparatus of claim 1, wherein the state information is collected from all of the plurality of modules of the network peripheral.

7. The apparatus of claim 1, wherein the resource management block is a virtual device implemented by software.

8. A method of multiplexing a specialized resource of an intelligent network-intelligent peripheral (In-IP), comprising:
   collecting state information of specialized resources from all modules of an IP;
   checking whether an error occurred, in each of the specialized resources, by analyzing the collected state information;
   isolating a pertinent specialized resource that experienced the error;
   collecting information about a service performed by the isolated specialized resource and information about a particular specialized resource available to replace the isolated specialized resource;
   generating a multiplexing message, according to the collected information, and dispersively transmitting the multiplexing message to selected ones of the modules having a small load and the particular specialized resource available; and
   resuming the service interrupted by the error, in accordance with the multiplexing message.

9. The method of claim 8, wherein the state information comprises number information, indicating the number of specialized resources supported by the corresponding module, and a state bit map indicating a state of each of the supported special resources.

10. The method of claim 8, wherein the multiplexing message is generated for each service disrupted by a faulty one of the specialized resources.

11. The method of claim 8, wherein the multiplexing message includes information identifying a number of the particular module having the particular specialized resource available, an index of the particular specialized resource, and the service.

12. The method of claim 8, wherein the state information is periodically collected from all of the modules.

* * * * *